United States Patent [19]
McCarron

[11] 3,782,172
[45] Jan. 1, 1974

[54] LEAK DETECTOR FOR FLUID CONDUCTORS

[75] Inventor: John K. McCarron, Houston, Tex.
[73] Assignee: Shell Oil Company, Houston, Tex.
[22] Filed: Sept. 1, 1972
[21] Appl. No.: 285,761

[52] U.S. Cl. ............................................. 73/40.5 R
[51] Int. Cl. ............................................. G01m 3/28
[58] Field of Search ........................... 73/40.5, 49.1

[56]  References Cited
UNITED STATES PATENTS

| | | | |
|---|---|---|---|
| 3,117,453 | 1/1964 | VerNooy | 73/40.5 X |
| 2,782,370 | 2/1957 | VerNooy | 73/40.5 X |
| 2,951,362 | 9/1960 | EnDean et al. | 73/40.5 |
| 3,162,505 | 12/1964 | Hall | 73/40.5 X |
| 3,196,686 | 7/1965 | Cole | 73/40.5 X |
| 3,382,705 | 5/1968 | Cole | 73/40.5 |
| 3,400,574 | 9/1968 | Cramer | 73/40.5 |
| 3,533,447 | 10/1970 | Moore et al. | 73/40.5 X |

Primary Examiner—Richard C. Queisser
Assistant Examiner—Joseph W. Roskos
Attorney—Theodore E. Bieber et al.

[57]  ABSTRACT

Pipeline leaks are detected by an in-line pig like device having an orifice plate mounted at each end of a frame member and differential pressure measuring means across each orifice at each end, the output of each differential pressure measuring means is in turn fed to another differential pressure sensing means, the output of which is transmitted to a recording means whereby a leak is detected when the duration of any change in a signal recorded corresponds to the difference in the distance between two sealing members disposed at each end of said frame member.

7 Claims, 1 Drawing Figure

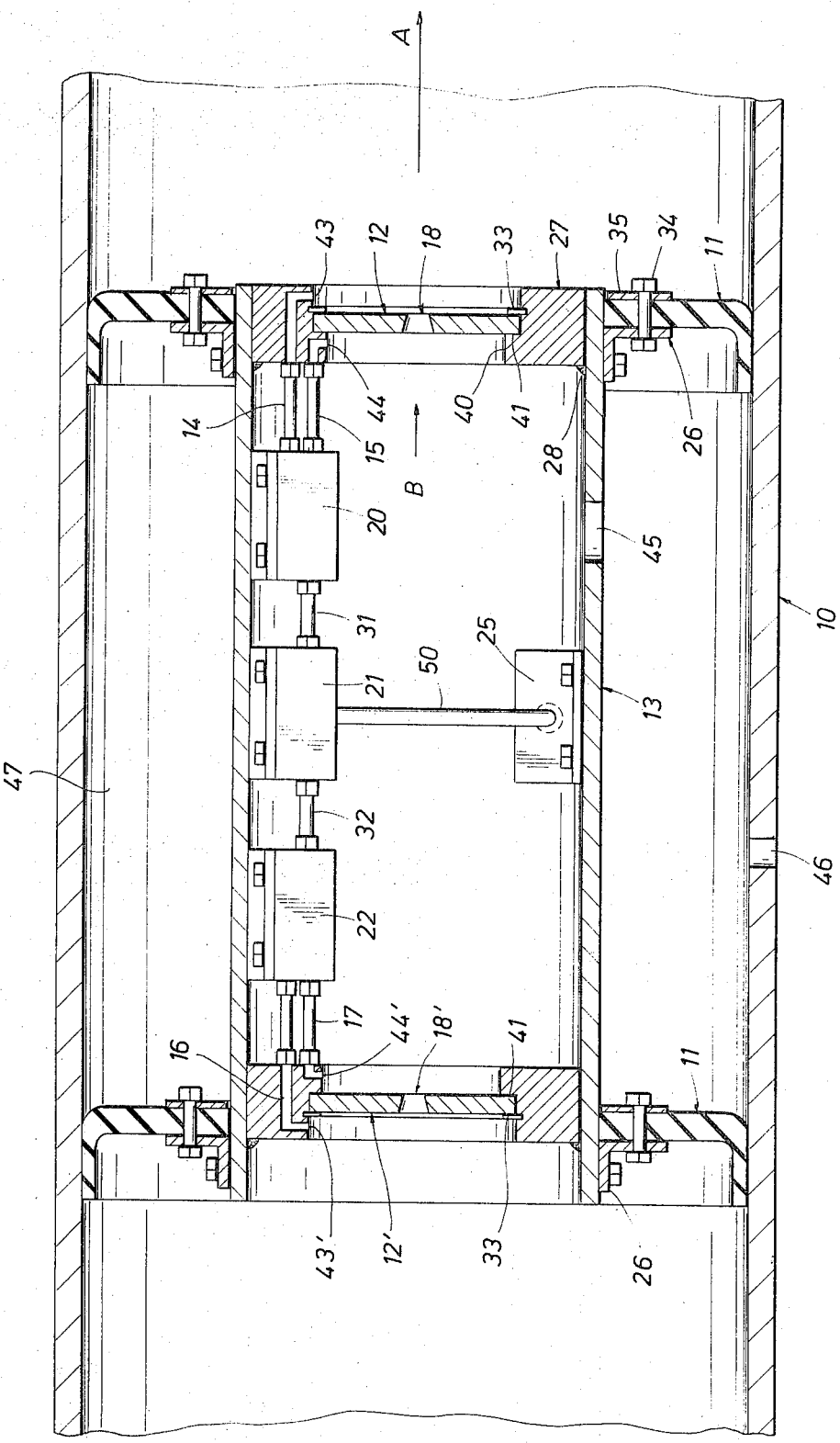

LEAK DETECTOR FOR FLUID CONDUCTORS

BACKGROUND OF THE INVENTION

1. Field of the Invention

This invention relates to an apparatus for detecting leaks in pipelines having fluid flowing therethrough and more particularly to an apparatus that passes through a fluid carrying pipeline, the fluid therein being under pressure, and detects leaks in the pipeline by means of measuring the duration of the change in a signal that measures the difference in flow rates between two flow sensing means mounted at the respective ends of the apparatus.

2. Description of the Prior Art

It is known that leaks in a pipeline may be determined to exist by sending certain acoustical or pressure responsive instruments through a pipeline and making a continuous record of sound or pressure as the recording instrument passes through the line. Instruments of this general type are well known and are usually mounted in a pipeline scraper or pig of conventional type for internal surveying of pipelines. The pig consists essentially of an elongated body member usually tubular in shape carrying a plurality of sealing members extending radially outward from the body to make a sealing contact with the wall of the pipeline, the pig being propelled or transported through the pipeline by flow of fluid therethrough.

It has been customary to mount instruments in the body of such pigs and send them through the pipeline to determine the existence of leaks along the line. U. S. Pat. No. 3,016,733 illustrates a device of this type. The apparatus of the 3,016,733 patent utilizes differential pressure to record the existence of a leak in a pipeline and does so by measuring and comparing the pressure on a leading edge of the pig compared to the pressure between two smaller sealing elements in contact with the inner wall of the pipeline. Therefore, any pressure difference between the isolated region of the smaller packing elements and a region in the pipeline ahead of the carrier or pig will effect a motion of the pen arm or recording device, and the difference in pressure is used as an indication of a leak.

Another U.S. Pat. No. 3,117,453 illustrates the use of differential pressure gauges and total pressure gauges to isolate the leak in a pipeline. This particular patent uses a differential pressure gauge that measures the difference of pressure between the forward and trailing edge of the pig and also has two total pressure gauges, one at the trailing edge of the pig and a second total pressure gauge between sealing cups that isolate a portion of the line. A leak in the pipeline is indicated using the apparatus of the U.S. Pat. No. 3,117,453, by comparing the difference in readings as recorded on a strip chart between the two total pressure gauges. This patent also demonstrates the use of acoustics by using a microphone for recording the sounds that may be made by escaping fluid between two sealing elements carried by the pig.

As can be seen, the prior art for leak detection in pipelines utilizes differential pressure measuring means, microphones or total pressure recordings in order to detect leaks in pipelines.

SUMMARY OF THE INVENTION

The present invention advantageously provides an apparatus and method for making internal surveys of pipelines, in which instruments continuously monitor the difference in the flow rate through two orifice plates, disposed at each end of the apparatus.

An even further advantage of the present invention is providing an apparatus in which the difference in flow rate through the two orifice plates is recorded as a function of time and/or distance indicating any leaks in the line by a change in signal that exists for a specified time duration, or for a specified distance of travel.

DESCRIPTION OF THE DRAWING

The nature of the present invention will be more fully appreciated with reference to the drawing in which:

The FIGURE shows a diagrammatical view of an embodiment of the present invention for detection of small leaks in a pipeline and simultaneously recording said leak.

DESCRIPTION OF A PREFERRED EMBODIMENT

Referring to the FIGURE, there is shown a device according to the invention being propelled through a pipeline 10 in the direction of flow as indicated by the arrow A. As the device passes through pipeline 10, sealing members 11 at each end of frame member 13 tend to resist movement because of the snug fit against the inner wall of the pipeline 10, and as a result there is a small pressure drop across the device. The resulting pressure drop or differential causes a part of the flow (arrow B) to pass through the device by way of holes 18 in first and second flow sensing means which are shown as orifice plates 12 and 12' at each end of the device. Orifice plates 12 and 12' can easily be replaced with flow nozzles, venturi meters or flow meters and not depart from the intent or scope of the present invention. A sensing port 43 is disposed on the downstream side of the first orifice plate 12 and sensing port 44 sense the pressure on each side of the forward or first orifice plate 12, these two pressures are then fed to a differential pressure sensing means 20 by way of sensing lines 14 and 15 respectively. The resulting difference in pressure is then fed to another differential pressure sensing means 21 by means of line 31. A second orifice plate 12' at the rear of the device has a similar set of sensing ports 43' and 44' which are in fluid communication with sensing means 22. The difference in pressure is fed to means 21 by way of line 32. Theoretically, under ideal conditions, the flow rate through each orifice plate 12 and 12' would be equal so that the two pressures sensed by the differential pressure sensing device 21 (lines 31,32) would be equal and the output from means 21 would be zero. In actual practice, however, it is unlikely that this would be true, due to different volume of fluid slippage past the sealing members 11 and the partial plugging of the holes 18 and 18' in the orifice plates 12 and 12'.

Again, referring to the FIGURE, each sealing member 11 is secured to the frame member 13, by a flange 26, a ring 35, and a plurality of screws 34 at each end of the frame member 13. The cylindrical shaped members 27 are secured to the frame member 13 by welds 28 on the outer diameter of each member 27. Each member 27 has a bore 40 therethrough and is further provided with a shoulder 41 for orifice plate 12 to butt against. A snap ring 33 or similar device retains the orifice plate 12 in place after installation. Each member 27 is further provided with sensing ports 43 and 44, one being disposed on each side of the orifice plates 12. Obviously there are many other embodiments of these same members which will accomplish the purpose of this invention.

In one embodiment of the present invention, the measuring or recording means 25, mounted on frame member 13 records the output signal from the differential pressure sensing means 21 as a function of the distance travelled through the pipeline 10. As the device travels through the pipeline 10, disturbances, such as welds, cause variations in the flow rates through the respective orifice plates 12, and the corresponding output signals from sensing means 21. However, there is only one condition where the change in the output signal from sensing means 21 will be of a duration corresponding to the distance between the sealing members 11 disposed at each end of frame member 13. This condition occurs when flow is either entering or leaving the volume encompassed by the pipeline 10 between the sealing members 11 at each end of the device through an aperture other than the holes 18 in each orifice plate 12 or slippage past sealing members 11. Therefore, the detection of leaks in the pipeline 10 is accomplished by measuring and/or recording the duration of the change in the output signal of sensing means 21, which change is a measure of the difference in the respect-ive flow rates through each orifice plate 12.

In a second method utilizing the apparatus of the present invention for the detection of leaks, the recording means 25 would record the output signal from sensing means 21 as a function of time. When used in this fashion, the device would be pumped through the pipeline 10 at a constant velocity so the distance between the sealing members 11 would be traversed in a known increment of time. Using this embodiment of the invention any leaks in the pipeline 10 would be indicated by a change in the output signal from sensing means 21 that would be of a duration equalling the increment of time hereinbefore described.

Using either of the previously described methods, the detection and location of a leak or leaks in the pipeline 10 can be determined from the distance travelled between the point of insertion into pipeline 10 and the point at which the change in signal of the required duration occurs.

When the output signal from sensing means 21 is recorded as a function of the distance travelled through the pipeline 10, the location of the leak or leaks may be read directly from the record. However, when the signal from 21 is recorded as a function of time, the distance from the point of insertion is calculated from a record of the rate of flow through the pipeline 10.

Further, the determination of leak location may be further refined by measuring the distance from known points of injection into or delivery from the pipeline 10, since either of these conditions will be recorded in much the same manner as a leak. Location of leaks may be further refined by marking the record at desired locations by external means such as magnets, encircling coils, or other means well known in the art.

The required time of duration of the change in signal from the sensing means 21 will vary depending upon the length of leak detector and the velocity at which the detector is propelled through the pipeline 10. Therefore, the specified time will vary and one skilled in the art would not have difficulty in specifying the required time depending upon any particular application of the leak detector.

The recording means 25 may record continuously and the resulting record be examined visually, or instrumentation may be installed to filter out all signals from 21 except those of the appropriate required duration to indicate leaks, and only these signals recorded as functions of distance or time. Or, the recording means may be magnetic tape or a similar device, and the recording examined and analyzed by a computer.

Only one embodiment of the present invention has been shown, but it would be obvious to substitute two diaphragm-type electrical pressure-sensitive devices having a variable output voltage and a bridge circuit for the differential pressure sensing means 20. A similar substitution would also be made for sensing means 22. The sensing means 21 would be replaced with a bridge-type circuit. Using this method would be equivalent to the previously described preferred embodiment.

In some circumstances involving clean fluids and smooth internal pipe surfaces, the quantity of fluid leaking may be determined by examination of the record. Careful examination of the record will also disclose certain other types of pipeline damage, such as dents in the pipe wall.

I claim as my invention:

1. An apparatus for detecting leaks in a pipeline, said apparatus being disposed to be propelled through the pipeline by the fluid flowing in the pipeline, said apparatus comprising:

a frame member;

seal means attached at each end of said frame member, said seal means being adapted to sealably engage the inside wall of said pipeline, said seal means being spaced to isolate the portion of the pipeline between said spaced seal means;

flow means disposed in each of said seal means for establishing a fluid flow path between opposite ends of said frame member, said flow path communicating with the portion of the pipeline isolated by said spaced seals;

first and second flow sensing means, one flow sensing means being mounted at each end of said frame member, said flow sensing means being mounted to detect the fluid flow through each of said flow means;

means for comparing the flow through each of said flow sensing means, said comparing means being adapted to receive a signal from each of said flow sensing means and having an output signal equal to the difference in signal from said first and second flow sensing means; and recording means for recording said output signal from said comparing means, said output signal being an indication of a leak in said pipeline when said signal exists for a specified duration of time.

2. The apparatus of claim 1 wherein said first and second flow means are orifice plates disposed in the ends of said frame member.

3. The apparatus of claim 2 wherein said means for comparing the flow through each flow sensing means comprises:

a first and second differential pressure measuring device, said devices being adapted to measure the difference in pressure on each side of said pair of orifice plates; and a third differential pressure measuring device, said device comparing the output signal from said first and second differential pressure measuring devices, said third differential pressure measuring device being in fluid communication with said first and second devices.

4. The apparatus of claim 1 wherein said recording means records said output signal as a function of time.

5. The apparatus of claim 1 wherein said recording means records said output signal as a function of distance travelled through said pipeline.

6. A method of detecting leaks in a pipeline wherein a device is propelled through the pipeline by the flow of fluid therethrough, said method comprising the steps of:

isolating a section of the pipeline between a first and second seal means;

establishing a fluid flow through said first seal means into said isolated section of the pipeline and then out said second seal means;

measuring the rate of flow through a first seal means disposed at the forward end of said device;

measuring the rate of flow through a second seal means disposed at the rear of said device; and comparing the difference of the rates of flow through said first and second seal means, said difference being an indication of a leak in said pipeline when said difference exists for a specific period of time.

7. The method of claim 6 further including the step of recording the difference in the rates of flow through said first and second seal means.

* * * * *